Nov. 14, 1961  H. D. DORFMAN ET AL  3,009,038
CIRCUIT INTERRUPTER
Filed Dec. 24, 1956  2 Sheets-Sheet 2

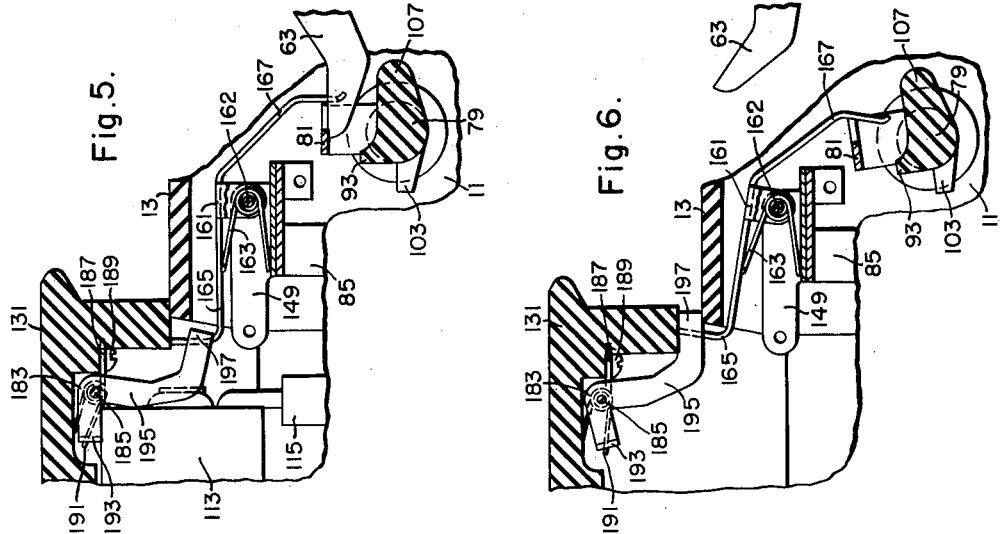
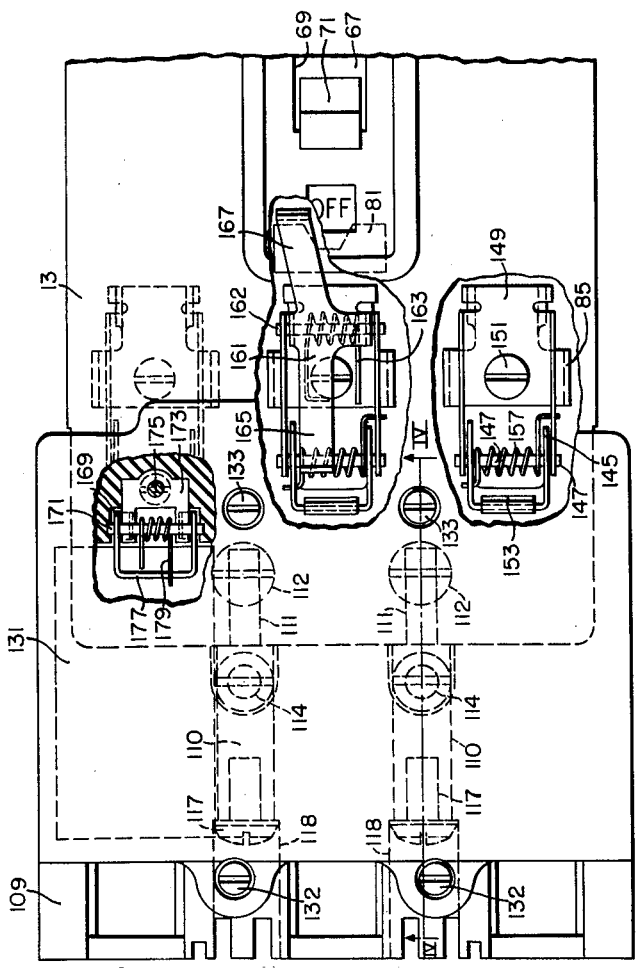

United States Patent Office 3,009,038
Patented Nov. 14, 1961

3,009,038
CIRCUIT INTERRUPTER
Hiller D. Dorfman and Howard E. Reichert, Beaver, Pa., assignors to Westinghouse Electric Corporation, East Pittsburgh, Pa., a corporation of Pennsylvania
Filed Dec. 24, 1956, Ser. No. 630,305
15 Claims. (Cl. 200—114)

This invention relates to circuit interrupters and more particularly to a circuit interrupter comprising a low-cost circuit breaker having a fusible member electrically connected in series relation therewith to interrupt fault currents for exceeding the interrupting capacity of the low-cost circuit breaker.

There are available current-limiting fuses having a rated interrupting capacity of 100,000 amperes, which means that they have the property of limiting the rise of current and of interrupting the current quickly before the instantaneous value of the current has risen to a peak value more than a small fraction of the available 100,000 ampere short-circuit current of the circuit. This current-limiting action is very desirable in that it protects the circuit and the apparatus connected therein from the destructive effects of the maximum available short-circuit current. On the other hand, the use of current-limiting fuses has a number of disadvantages as compared with the use of circuit breakers. For one thing, the current limiting fuse is a relatively expensive type of fuse and if the circuit is one which is subject to frequent small overload currents or to relatively high-resistance short-circuit currents, the cost of repeatedly replacing the fuses becomes a large item of expense. Another disadvantage in the use of fuses is that a fault on a single conductor of a three-phase circuit may blow only one fuse, or one of the fuses may be unintentionally omitted, with the result that single phase power is supplied over the other conductors. This can result in the burning out of motors or other equipment which may continue to operate on single-phase, though designed for three-phase operations.

It is an object of this invention to provide an improved unitary circuit interrupter which largely retains the advantages of circuit breakers over fuses and at the same time embodies the desirable current-limiting function of current-limiting fuses when there is a heavy short circuit, without requiring the use of an expensive circuit breaker of high interrupting capacity.

Another object of this invention is to provide a unitary circuit interrupter comprising a circuit breaker having an insulating housing composed of a base and cover for housing a circuit breaker having current-limiting fuse means and a separate cover or holder for the fuse means, means being provided for preventing placing the fuse cover in position without the fuse in place in said fuse cover.

Another object of the invention is to provide a unitary circuit interrupter having an insulating housing comprising a base and cover for housing a circuit breaker having current-limiting fuses and a separate cover or holder for the fuses with means for tripping the circuit breaker open when the fuse cover or holder is removed and means preventing placing the fuse cover or holder in position without all of the fuses in place.

Another object of the invention is to provide a unitary circuit interrupter having an insulating housing comprising a base and cover for housing a circuit breaker having current-limiting fuse means and a separate holder or cover for the fuse means, and means for tripping the circuit breaker open when the fuse holder or cover is removed.

Another object of the invention is to provide a unitary circuit interrupter comprising a circuit breaker and current-limiting fuse means, having a bimetal element responsive to overload currents to trip the circuit breaker open and means operable when the fuse means blows to actuate the bimetal element to tripping position and hold the bimetal element in tripping position until the blown fuse is removed.

Another object of the invention is to provide a unitary circuit interrupting device comprising a circuit breaker and current-limiting fuse means and a separate holder for the fuse means, a bimetal element responsive to overload currents to trip the circuit breaker open and means operable when the fuse means blows to move the bimetal element to tripping position and hold the bimetal element in tripping position until the blown fuse is removed, means being provided operable when the fuse holder is removed to prevent resetting of the breaker mechanism independently of any movement of the bimetal element.

Another object of the invention is to provide a unitary circuit interrupting device comprising a circuit breaker and current-limiting fuse means having a pair of terminals, a housing in which the circuit breaker is mounted, a pair of connections with which the fuse terminals are removably engageable, one of said connections being mounted on the circuit breaker housing and the other of said connections being mounted on an extension rigidly secured to the circuit breaker housing.

The invention, both as to structure and operation, together with additional objects and advantages thereof, will be best understood from the following detailed description thereof when read in conjunction with the accompanying drawings.

In said drawings:

FIGURE 1 is a top plan view partly broken away of a circuit interrupter embodying the principles of the invention;

FIG. 5 is a detailed view of a modified structure having means for tripping the breaker when the fuse holder or cover is removed and for preventing placing the fuse holder in position without all of the fuses in position, the parts being shown in the normal position with the fuses all in the fuse holder; and FIG. 6 is a view similar to FIG. 5 but showing the parts in the positions they assume when an effort is made to place the fuse holder in position with one of the fuses omitted.

Figure 2:
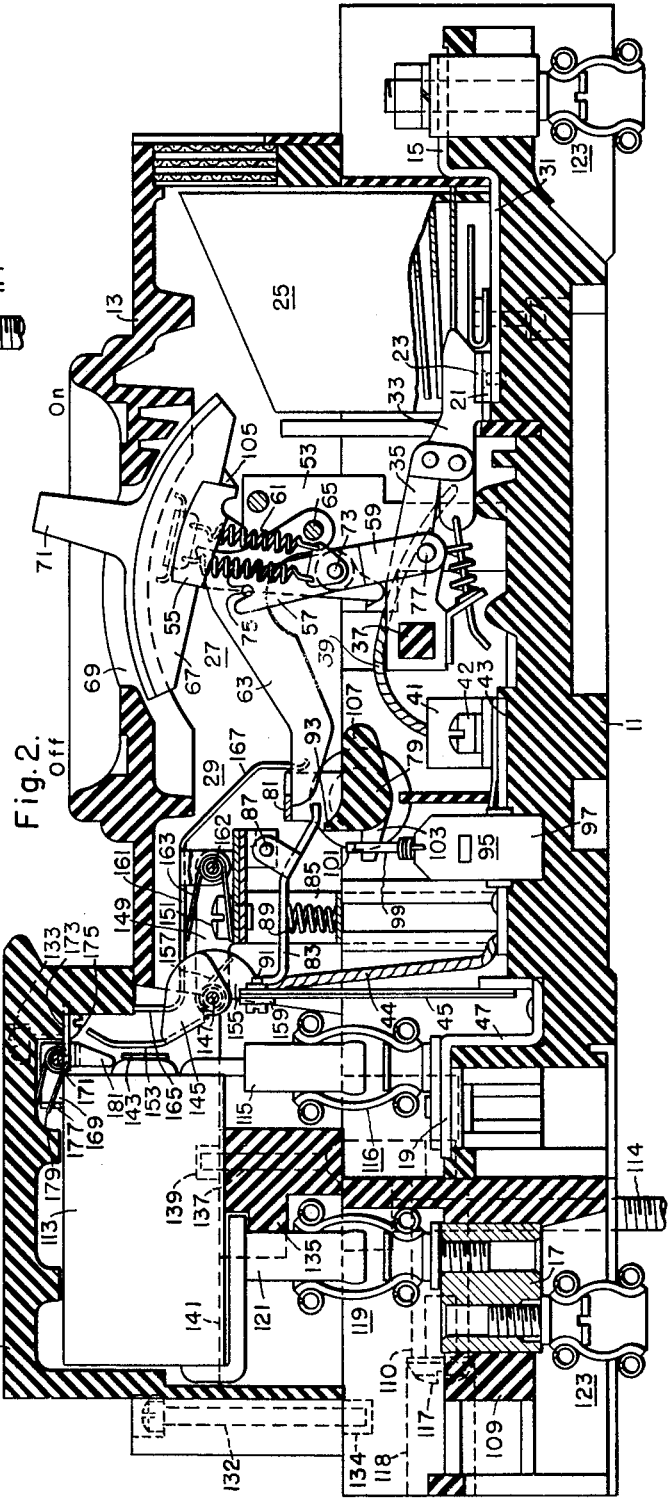
FIG. 2 is a vertical sectional view taken substantially through the center pole of the circuit interrupter.

Referring to FIG. 2 of the drawings, the circuit interrupter comprises a base 11 of molded insulating material on which the several components of the circuit breaker mechanism and the current-limiting fuses are mounted. A cover 13 of molded insulating material, which may be fastened or sealed to the base 11, cooperates with the base to form an enclosing housing for the circuit breaker.

The circuit interrupter is of the multi-pole type, each pole having a line terminal 15 and a load terminal 17 disposed at opposite ends of the base 11 and a terminal 19 disposed intermediate the ends of the base. The circuit breaker mechanism may be of the general type disclosed in Patent No. 2,419,125, issued April 15, 1947 to Hiller D. Dorfman and Gerald J. Freese, the mechanism being shown and briefly described herein for purposes of illustration. The circuit breaker includes a stationary contact 21, a movable contact 23 and an arc extinguisher 25 for each pole of the breaker. A common operating mechanism 27 is provided for simultaneously actuating the three movable contacts to open and closed positions, and a trip device indicated generally at 29 serves to effect automatic opening of the breaker contacts in response to predetermined overload conditions in the circuit through any pole of the breaker.

The line terminal 15 forms the outer end of a conducting strip 31 which extends into the housing and rigidly supports the stationary contact 21. The movable contact 23 for each pole is carried by a contact arm 33 supported on a switch arm 35 secured on a tie bar 37 which extends across all of the poles of the breaker and supports the switch arms for the several poles of the breaker for movement together to open and closed positions. The contact arm 33 is connected by a flexible conductor 39 to a terminal 41 secured to the base 11 by a screw 42 which also serves to secure one end of a conducting strip 43 to the base 11. A flexible conductor 44 connects the other end of the conducting strip 43 to the free end of a bimetal element 45 having its other end rigidly supported on one end of a conducting strip 47, the other end of which comprises the terminal 19.

The operating mechanism 27 (FIG. 2) for the breaker is disposed in the center compartment of the housing and is supported by a pair of spaced frame members 53 (only one being shown) secured to the base 11. The operating mechanism comprises a pivoted forked operating lever 55, a toggle comprising links 57 and 59, overcenter springs 61 and a pivoted releasable cradle 63 pivoted on a pin 65 and controlled by the trip device 29. An arcuate insulating shield 67 for substantially closing an opening 69 in the cover 13 is mounted on the end of the operating lever 55 and has an integral handle 71 extending out through the opening 69 to permit manual operation of the breaker mechanism.

The toggle links 57—59 are pivotally connected together by a pivot pin 73. The toggle link 57 is pivotally connected by a pivot pin 75 to the cradle 63 and the toggle link 59 is pivotally connected to the switch arm 35 for the center pole by a pivot pin 77. The overcenter springs 61 are connected under tension between the knee pivot pin of the toggle 57—59 and the outer end of the operating lever 55.

The circuit breaker is operated to the open position by manipulation of the handle 71 (FIG. 2) in a counterclockwise direction to the "off" position actuating the overcenter springs 61 to cause collapse of the toggle 57—59 and opening movement of the switch arms 35 for all of the poles of the breaker in a well-known manner.

The breaker is manually closed by reverse movement of the handle 71 from the "off" to the "on" position which causes the springs 61 to move overcenter and straighten the toggle, thereby moving the switch arms 35 for all of the poles to the closed position.

As previously set forth, the trip device 29 includes a bimetal element 45 connected in series relation in the circuit for each pole of the breaker. The trip device also includes a pivoted trip bar 79 of molded insulating material which extends across all of the poles of the breaker. A latch member 81 mounted on the trip bar 79 normally engages the latch end of the releasable cradle 63 and restrains the cradle in operative position.

Each pole of the breaker is provided with a latched lever 83 pivotally supported on a U-shaped frame 85 by a pivot pin 87, the frame 85 being mounted on the base 11 of the breaker. A compression spring 89 is provided to bias the lever 83 in a clockwise direction. Clockwise rotation of the lever 83 is normally prevented by engagement of its latch end with a latch 91 on the free end of the bimetal 45.

When the bimetal 45 for any pole of the breaker is heated a predetermined amount in response to an overload current, it flexes in a direction to unlatch its corresponding lever 83 whereupon the spring 89 snaps the lever in a clockwise direction causing the end of the lever to strike a projection 93 on the trip bar 79 and move the trip bar to tripping position. This causes the latch 81 to release the cradle 63 and effect opening of the breaker.

The trip device also includes a series overload tripping electromagnet which functions to instantaneously trip the breaker in response to heavy overload currents, for instance, 1000% or more of rated current or short circuit currents occurring in the circuit of any pole of the breaker.

For this purpose, each pole of the breaker is provided with an electromagnet indicated generally at 95 which includes a U-shaped magnet yoke 97, through the bight of which the conductor 43 extends, and a hinged armature 99 having a projecting arm 101 adapted to engage a projection 103 on the trip bar 79 and move the trip bar to tripping position.

When the trip bar 79 is moved in unlatching direction either by release of the lever 83 or operation of the tripping magnet 95, the latch 81 releases the cradle 63 and permits the springs 61 to rotate the cradle in a clockwise direction about its pivot 65. This carries the pivot pin 75 over to the right of the line of action of the springs 61 and effects collapse of the toggle 57—59 and opening movement of the switch arms 35 for all of the poles.

It is necessary to reset and relatch the mechanism before the contacts can be closed following an automatic opening operation. Resetting and relatching is effected by moving the operating lever 55 by the handle 71 counterclockwise as far as it will go. During this movement a projection 105 on the operating lever 55 engages a shoulder on the cradle 63 and moves the latter in a counterclockwise direction. As the cradle 63 is rotated the latch end thereof passes the latch 81 and engages a projection 107 on the trip bar 79 rocking the latter clockwise slightly past its normal position. At this rotation of the trip bar 79 the projection 93 thereon rocks the lever 83 counterclockwise compressing the spring 89 and reengaging the lever 83 with the latch 91. The latch 81 has now assumed its normal latching position in the path of the cradle 63. The contacts are closed in the previously described manner.

The arc extinguisher 25 may be of any suitable type, the one shown consisting of a plurality of slotted plates of magnetic material into which the arc is drawn and quickly extinguished.

According to the present invention, a current-limiting fuse 113 is provided for each pole of the interrupter all of which are mounted in or on a separate fuse holder or housing which is attached to the load end of the circuit breaker housing so that, together with the fuses, it can be removed without removing the circuit breaker cover.

One terminal 115 of the fuse 113 is connected to the intermediate terminal 19 of the breaker by means of a plug-in type connector 116 secured to the terminal 19. The other terminal 121 of the fuse 113 is similarly connected to the load terminal 17 by a plug-in type connector 119. The line terminals 15 and the load terminals 17 at opposite ends of the base are provided with suitable connectors 123 for connecting the circuit interrupter in an electrical circuit.

Figure 4:
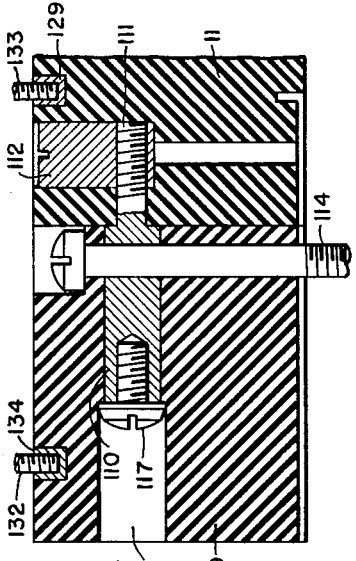
FIG. 4 is a detail sectional view taken on line IV—IV of FIG. 1 showing the means for attaching an extension to the base of the circuit breaker to support the fuses.

The load terminals 17 are mounted in an extension 109 (FIGS. 2 and 4) of molded insulating material which is rigidly secured to the load end of the molded base 11 of the circuit breaker. The extension 109 is secured to the base 11 by spaced studs 110 having reduced and threaded ends 111 which are threaded into tapped openings in metal inserts 112 in the base 11 of the breaker. The studs 110 have openings therein for receiving mounting bolts 114 for mounting the circuit interrupter on a support means. After the extension is assembled, as shown in FIG. 4, screws 117 disposed in a counterbore 118 are threaded into tapped openings in the ends of the studs 110 and tightened against the shoulder of the counterbore to thus rigidly hold the extension against the end of the base 11.

The fuses 113 for all of the poles are mounted in a separate housing or holder 131 of insulating material removably secured to the base 11 by means of screws 133 which threadedly engage metal inserts 129 (FIG. 4) in the base 11 and by screws 132 which threadedly engage metal inserts 134 (FIGS. 2 and 4) in the extension 109. Thus, the fuse holder 131, together with the fuses, can be removed without removing the circuit breaker cover 13. The fuses 113 are rigidly held in the fuse holder 131 by a cross bar 135 rigidly secured to the bottom of the fuse holder 131 by screws 137 (only one being shown) which are threaded into metal inserts 139 molded in barriers 141 in the fuse housing and extending between the fuses 113.

When an overload current close to or above the interrupting capacity of the circuit breaker occurs, one or more of the fuses 113 will blow and interrupt the current. The tripping electromagnet 95 will also function in most cases to actuate the trip bar 79 and trip the breaker open even though the fuse will interrupt the current before the breaker contacts open.

Figure 3:
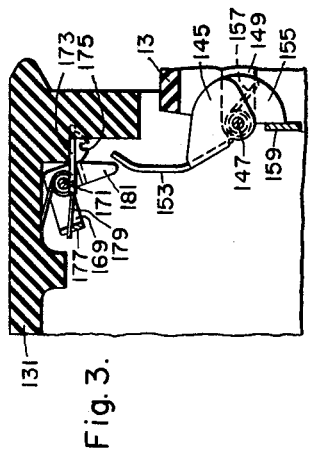
FIG. 3 is a fragmentary view showing the means for actuating the tripping bimetal element to tripping positions when the fuse holder is placed in position with one of the fuses omitted.

The trip bar 79 is biased by spring means (not shown) to return to its normal latching position following an operation of one of the tripping electromagnets so that the mechanism can be relatched and the breaker closed with one of the fuses blown. This would result in single-phasing. Means is provided to hold the trip bar 79 in tripped position following the blowing of a fuse to prevent relatching of the breaker mechanism and closing the breaker contacts until the blown fuse is removed. This means comprises a spring-loaded plunger or actuator 143 (FIG. 2) on each of the fuses which is biased to move toward the right when the fuse blows. This plunger and the spring or other means for operating it may be in one of the forms disclosed in Rawlins et al. Patent No. 2,435,844, issued February 10, 1948. The plunger 143 of each fuse actuates one of three pivoted trip levers 145 (FIGS. 2 and 3), there being a trip lever 145 for each pole of the breaker. Each lever or member 145 is pivotally mounted on a pin 147 supported in a bracket 149 mounted by means of a screw 151 on the top portion of the U-shaped frame 85 which supports the trip actuating lever 83. The lever 145 has an upwardly extending arm 153 which is positioned to be engaged by the plunger 143 when the fuse blows to actuate the lever 145 in a clockwise direction. The lever 145 also has a downwardly extending arm 155 which is biased by a light spring 157 against a conducting tab 159 rigidly secured to the free end of the bimetal element 45 and to which the flexible conductor 44 is secured.

When a fuse 113 blows, the plunger 143 strikes the arm 153 and rotates the lever 145 sharply clockwise causing the arm 155 of the lever 145 to bend the bimetal 45 in tripping direction. This releases the actuating lever 83 which is immediately snapped by its spring 89 in a clockwise direction causing the end of the lever 83 to engage the projection 93 and hold the trip bar 79 in tripping position. The trip bar 79 will thus be held in tripped position until the blown fuse is removed. This results because the bimetal 45 is held bent back by the arm 155 actuated by the plunger 143 of the fuse which has blown, so that the latch portion 91 on the bimetal 45 cannot engage and hold the end of the lever 83 if an attempt were made to reset the lever 83 to its latched position. With the trip bar 79 held in the tripped position by any one of the levers 83, the breaker mechanism cannot be reset and the breaker cannot be closed.

The fuse housing or holder 131 together with the fuses 113 are removed from the interrupter by first removing the screws 132 and 133 and then lifting the fuse holder 131 upwardly to disengage the fuse terminals 115 and 121 from their respective plug-in connectors 116 and 119. As the fuses and the fuse holder are removed, the plunger 143 of the blown fuse or fuses is removed from its restraining contact with the arm 153 of the lever 145 and the resilience of the bimetal 45 causes the free end of the bimetal to resume its latching position. With the bimetal 45 in latching position the mechanism could be relatched and the breaker contacts closed. While, in this situation, the circuit would be open between the plug-in connectors 116 and 119, a dangerous condition would obtain if an effort were made to reinsert the fuses with an excessive fault current on the line. Means is provided to prevent return of the trip bar to latching position when the fuse housing or holder is removed and to hold it in unlatching position until the fuse holder is returned to its position on the interrupter and the fuses are reengaged with their plug-in connectors.

The means for holding the trip bar in the unlatching position when the fuse holder is removed from the interrupter comprises a pivoted lever 161 pivotally mounted on a pin 162 on the bracket 149 which supports the lever 145, and biased in a clockwise direction by a spring 163. One arm 165 of the lever 161 is biased by the spring 163 against the fuse holder 131 and the other arm 167 of the lever is normally disposed adjacent the latch 81 on the trip bar. Removal of the fuse holder 131 permits the spring 163 to move the lever 161 in a clockwise direction causing the arm 167 to engage the latch 81 and hold the trip bar 79 in unlatching position. When the fuse housing or holder is replaced on the interrupter the edge of the holder engages the upturned end of the arm 165 and moves the lever 161 counterclockwise to the positions shown in FIG. 2 thereby freeing the trip bar so that the latter can be moved to its latching position.

The spring 163 moves the lever 161 to a position to hold the trip bar in tripping position before the fuse terminals 115 and 121 separate from their respective plug-in connectors thereby making it impossible to draw an arc between the fuse terminals and their plug-in connectors as could be done if the fuses were pulled out while the breaker contacts are closed and current is flowing. If the fuse housing is removed without a fuse having blown and with the breaker closed, the spring 163 is of sufficient strength that it will cause the arm 167 of the lever 161 to engage and move the trip bar to tripping position thus tripping the breaker open. The lever 161 also prevents the circuit breaker from being closed if the fuses should be plugged in separately without first being mounted in the holder 131 which serves as a housing or cover to prevent contact with the live parts when they are energized.

If the fuse holder should be placed in position on the interrupter with a blown fuse still in the holder, the plunger 143 of the blown fuse would engage the arm 153 of the lever 145 and through the arm 155 of the lever hold the free end of the bimetal 45 in tripping position. This permits the spring 89 to hold the trip lever 83 in position to hold the trip bar in unlatching position. This insures that all of the blown fuses are removed before the fuses and fuse holder are replaced on the interrupter.

As set forth previously, the fuse holder when replaced in position on the interrupter actuates the lever 161 so that the trip bar can be moved to its latching position. The breaker mechanism can then be relatched and the breaker closed. This could give rise to a dangerous condition should the fuse holder be replaced with one of the fuses omitted. Means is provided to trip the breaker open if the fuse holder is placed in position without all of the fuses in position in the holder.

This means comprises a bell crank 169 (FIGS. 2 and 3) for each fuse mounted on a pin 171 supported in the fuse holder 131 and held in place by a plate 173 which is secured to the holder by a screw 175 as viewed in FIG. 2. With the fuse 113 in position in the holder, arm 177 of the bell crank 169 is held against the bias of a spring 179 by the fuse, thus holding the other arm 181 free of and to the left of the curved upper end of the arm 153 of the lever 145. When the fuse 113 is removed the spring 179 moves the bell crank 169 counterclockwise to the position shown in FIG. 3. Should an effort be made to replace the fuse holder in position on the interrupter with one of the fuses omitted, the arm 181 of the bell crank 169 would engage the curved upper end of the arm 153 and move the lever 145 in a clockwise direction causing the arm 155 thereof to bend the free end of the bimetal in unlatching direction. This releases the trip lever 83 whose spring 89 immediately moves the lever 83 in tripping direction causing the end thereof to engage and move the trip bar 79 to tripping position and hold the trip bar in tripping position until all of the fuses are in position in the fuse holder.

The bell cranks 169 are mounted on the removable fuse holder 131 and are removable therewith from the circuit interrupter. This has the advantage that the position of the bell crank 169 can be visually checked before the holder is placed in position on the interrupter.

FIGS. 5 and 6 illustrate a device for preventing return of the trip bar 79 to its latching position when the fuse holder 131 is placed in position on the interrupter and one or more of the fuses are omitted. This device comprises a bell crank lever 183 pivoted on a pin 185 supported in the fuse holder and held in position by a plate 187 which is attached to the fuse holder by a screw 189. The lever 183 is biased by a spring 191 in counterclockwise direction but is normally held in the position shown in FIG. 5 by the fuse 113 engaging one arm 193 of the bell crank lever 183. The other arm 195 of the bell crank lever extends downwardly and to the right as shown in FIG. 5. With the end 197 of the arm clear of the circuit breaker cover 13, the bell crank 183 is restrained in the position shown in FIG. 5 as long as the fuse 113 is in place in the fuse holder 131. As previously set forth, it is necessary to remove the fuse holder 131 together with all of the fuses in order to replace a blown fuse. When the fuse is removed from the holder the spring 191 moves the bell crank 183 counterclockwise until the end 197 of the arm 195 thereof engages the same edge of the holder 131 which engages and normally holds the lever 161 in the position shown in FIG. 5. When an attempt is made to place the fuse holder 131 on the interrupter with one or more of the fuses omitted from the holder, the end 197 of the arm 195 engages the breaker cover 13 and blocks complete downward movement of the housing 131 as shown in FIG. 6. The width of the end 197 of the arm 195 is such that it prevents the housing 131 from moving the lever 161 counterclockwise to free the trip bar 79. Hence the lever 161 biased by the spring 163 will hold the trip bar in its unlatching position until the fuse holder is removed and the missing fuse is replaced so that all three fuses are in position in the holder. While the fuse terminals 115 and 121 may engage their respective plug-in connectors 116 and 119 no current will flow since the breaker contacts are open and cannot be closed for the reason that the mechanism cannot be relatched so long as the trip bar 79 is held in the tripped position by the lever 161.

The invention provides a circuit interrupter comprising a manually and automatically operable circuit breaker having current-limiting fuses of high interrupting capacity in series therewith. The operating characteristics of the two devices are so related that the circuit breaker functions in a conventional manner in response to fault currents well within its interrupting capacity and the fuses become effective to interrupt fault current close to or greater than those which the circuit breaker can safely interrupt. The circuit breaker is mounted on its own housing and the fuses are mounted partly on the circuit breaker housing and partly on an extension, rigidly attached to the load end of the housing. Means is provided to prevent resetting of the breaker mechanism and closing the breaker contacts following the blowing of a fuse until the blown fuse is removed. Means is provided to prevent resetting the breaker mechanism when any fuse blows and until the fuse housing is removed and also until the fuse housing is replaced with all of the fuses in place in the fuse housing. There is also provided means for blocking complete placement of the fuse holder in its position on the interrupter if any of the fuses is omitted from the fuse housing, thus preventing the resetting of the breaker mechanism until all of the fuses are in place in the fuse housing.

Having described the invention in accordance with the provisions of the patent statutes, it is to be understood that various changes and modifications may be made in the structural details disclosed and in the arrangement of parts without departing from the spirit of the invention.

We claim as our invention:

1. A circuit interrupting device comprising separable contact means and means releasable to effect automatic separation of said contact means, a trip bar movable to a tripping position to effect release of said releasable means, fuse means removably connected in series relation with said separable contact means, stored-energy means operable when released to engage and move said trip bar to tripping position, a bimetal element normally restraining said stored-energy means and operable to a tripping position in response to overload currents to release said stored-energy means, actuating means actuated when said fuse means blows to operate said bimetal element to said tripping position to release said stored-energy means, and biased sensing means responsive to the absence of said fuse means to actuate said actuating means and operate said bimetal element to tripping position.

2. A circuit interrupting device comprising separable contact means and means releasable to effect automatic separation of said contact means, a trip bar movable to a tripping position to effect release of said releasable means, fuse means removably connected in series relation with said separable contact means, a fuse holder and fuse means removable therewith, stored-energy means operable when released to engage and move said trip bar to tripping position, a bimetal element normally restraining said stored-energy means and operable to a tripping position in response to overload currents to release said stored-energy means, actuating means actuated when said fuse means blows to operate said bimetal element to said tripping position to release said stored-energy means and to hold said bimetal element in said tripping position until said blown fuse means is removed, and spring-biased sensing means operable when said fuse holder is removed to engage and move said trip bar to tripping position.

3. A circuit interrupting device comprising separable contact means and means releasable to effect automatic separation of said contact means, a trip bar movable to a tripping position to effect releasing of said releasable means, fuse means removably connected in series relation with said separable contact means, a fuse holder having said fuse means removable therewith, stored-energy means operable when released to engage and move said trip bar to tripping position, a bimetal element normally restraining said stored-energy means and operable to a tripping position in response to overload currents to release said stored-energy means, actuating means actuated when said fuse means blows to operate said bimetal element to said tripping position to release said stored-energy means and to hold said bimetal element in said tripping position until said blown fuse means is removed, spring-biased sensing means operable when said fuse holder is removed to engage and move said trip bar to tripping position, and biased sensing means responsive to the absence of one of said fuse means to prevent placing of said fuse holder in position.

4. A circuit interrupting device comprising separable contact means and means releasable to effect separation of said contact means, a trip bar movable to a tripping position to effect release of said releasable means, a fuse removably connected in series relation with said separable contact means, a trip lever biased to engage and move said trip bar, a current responsive bimetal element normally restraining said trip lever and operable to a tripping position in response to abnormal conditions to release said trip lever, an actuating member biased against said fuse, a lever having an end disposed to engage a portion of said bimetal element, said actuating member when said fuse is absent being actuated to engage and operate said lever to cause said lever to move said bimetal element to its tripping position and release said trip lever, and means actuated when said fuse blows to engage said lever and operate said lever and cause said lever to move said bimetal element to its tripping position.

5. A multi-pole circuit interrupting device comprising a plurality of separable contact means and means releasable to effect separation of said contact means, a trip device comprising a trip bar common to all of the poles movable to a tripping position to effect release of said releasable means, a bimetal element in each pole operable in response to overload currents to effect movement of said trip bar to tripping position, a fuse in each pole and means removably connecting each of the fuses in series relation with one of said separable contact means, a fuse holder connecting said fuses together for removal as a unit, an actuator in each pole adjacent a part of the bimetal element, means on each of said fuses comprising a spring-biased plunger actuated when the fuse blows to move said actuator to cause the actuator to mechanically move the bimetal element to thereby effect movement of the trip bar to its tripping position, and sensing means in each pole responsive to the absence of the fuse for any of the poles to operate the actuator and move the associated bimetal element to tripping position.

6. A multi-pole circuit interrupting device comprising a plurality of separable contact means and means releasable to effect separation of said contact means, a trip device comprising a trip bar common to all of the poles movable to a tripping position to effect release of said releasable means, a bimetal element in each pole operable in response to overload currents to effect movement of said trip bar to tripping position, a fuse in each pole and means removably connecting each of the fuses in series relation with one of said separable contact means, a fuse holder connecting said fuses together for removal as a unit, an actuator in each pole adjacent a part of the bimetal element, means on each of said fuses comprising a spring-biased plunger actuated when the fuse blows to move said actuator to cause the actuator to mechanically move the bimetal element to thereby effect movement of the trip bar to its tripping position, sensing means in each pole responsive to the absence of the fuse for any of the poles to operate the actuator and move the associated bimetal element to a tripping position, and a sensing member operable when said fuse holder is removed to engage and move said trip bar to tripping position.

7. A multi-pole circuit interrupting device comprising a plurality of separable contact means and means releasable to effect separation of said contact means, a trip device comprising a trip bar common to all of the poles movable to a tripping position to effect release of said releasable means, a bimetal element in each pole operable in response to overload currents to effect movement of said trip bar to tripping position, a fuse in each pole and means removably connecting each of the fuses in series relation with one of said separable contact means, a fuse holder connecting said fuses together for removal as a unit, an actuator in each pole adjacent a part of the bimetal element, means on each of said fuses comprising a spring-biased plunger actuated when the fuse blows to move said actuator to cause the actuator to mechanically move the bimetal element to thereby effect movement of the trip bar to its tripping position, sensing means in each pole responsive to the absence of the fuse for any of the poles to operate the actuator and move the associated bimetal element to a tripping position, and a sensing member operable when said fuse holder is removed to engage and move said trip bar to tripping position, and to hold said trip bar in tripping position independently of any movement of said bimetal element.

8. A circuit interruping device comprising a base having thereon separable contact means and means releasable to effect separation of said contact means, fuse means removably connected in series relation with said contact means, a fuse holder for said fuse means removably mounted on said base and removable from said base with said fuse means, sensing means responsive to the absence of said fuse means from said holder, and a portion actuated by said sensing means in the absence of the fuse means from the holder preventing placing of said fuse holder in position on said base.

9. A circuit interrupting device comprising separable contact means and means releasable to effect separation of said contact means, fuse means removably connected in series relation with said separable contact means, a fuse holder for said fuse means removable therewith, sensing means mounted in said fuse holder and responsive to the absence of said fuse means from said holder, and a portion actuated by said sensing means in the absence of the fuse means from the holder preventing placing said fuse holder in position.

10. A multi-pole circuit interrupting device comprising a housing, separable contact means for each pole and means operable to effect separation of said contact means, a fuse holder on which a plurality of fuses is mounted together as a unit, said fuse holder being removably mounted on said housing, a plurality of sensing members, each of said sensing members being responsive to the absence of one of said fuses from said holder, and blocking means actuated by said sensing members when any fuse is absent from the holder and then blocking placing of said fuse holder in position on said housing.

11. A circuit interrupting device comprising a housing, separable contact means and means operable to effect automatic separation of said contact means, fuse means removably connected in series relation with said separable contact means, a fuse holder for said fuse means removably positioned on said housing and removable with said fuse means from said housing, and biased sensing means movable in response to the absence of said fuse means from said fuse holder and having a blocking portion which then engages a portion of said housing to prevent placing said fuse holder in position on said housing.

12. A circuit interrupting device comprising a housing including a base portion and a cover portion, separable contact means and means releasable to effect separation of said contact means, fuse means removably connected in series relation with said separable contact means, a fuse holder for said fuse means removably positioned on said base portion and removable with said fuse means from said base portion of said housing, biased sensing means mounted on said fuse holder and movable in response to the absence of said fuse means from said holder, and blocking means movable by said sensing means to a position where it engages said cover portion and prevents placing said fuse holder in position on said base portion.

13. A circuit interrupting device comprising a base of insulating material, separable contact means on said base, a pair of connectors connected in series with said separable contact means, one of said connectors being mounted on said base, an extension of insulating material at the end of the base and supporting the other of said connectors, a hole extending into the base in a direction generally perpendicularly to the bottom of the base, an insert in the hole in the base and a threaded opening in the insert extending generally normal to the hole in the base, a first hole in the extension extending in the direction longitudinally of the base and in line with the threaded opening in the insert, a stud in said first hole in the extension and having threads engaging the threaded opening in the insert, an opening transversely through the stud, a second hole through the extension at substantially a right angle to the first hole therein, and said opening transversely through the stud and said second hole through the extension being substantially in alignment and providing a continuous opening through both the stud and extension in which a member may be placed to mount the circuit interrupating device.

14. A circuit interrupting device comprising a base of insulating material, a plurality of pairs of separable contacts on said base, a plurality of pairs of fuse connectors with each pair electrically in series with one pair of the separable contacts, one of said fuse connectors of each pair being mounted on said base adjacent one end thereof, an extension of insulating material positioned on said end of the base with the other fuse connector of each pair mounted on said extension, a threaded portion on the base, an opening through the extension extending in the direction longitudinally of the base and in alignment with the threaded portion on the base, said opening through the extension being of one size adjacent the end of the base and of larger size at the other end thereof and having a shoulder between the two portions of different sizes, a stud in said opening through the extension and having threads at each end thereof, one end of said stud threadedly engaging said threaded portion on the base, and a screw member threadedly engaging the threads at the other end of said stud and having a head engaging the sohulder in the opening through the extension and holding the extension tight against the end of the base.

15. A multi-pole circuit interrupting device comprising a housing including a base portion and a cover portion both of molded insulating material, separable contact means for each pole, a plurality of members each individually movable in response to an overload in one pole and operable to effect separation of said contact means, a plurality of pairs of connectors with each pair electrically connected in series with said separable contact means for one pole, a plurality of fuses each having terminals for engaging one pair of connectors and each having a spring-biased plunger ejected upon blowing of the fuse, a fuse holder on which said plurality of fuses are mounted together as a unit, a plurality of independently movable pivoted members each mounted on said base, each of said pivoted members being independently responsive to the plunger ejected by blowing of one of said fuses to each cause movement of one only of said members movable individually in response to an overload and thereby cause said operating means to effect automatic separation of said contact means, and a plurality of spring-biased sensing members each normally restrained and when released each engaging and applying the force of its spring to move one of said independently movable pivoted members and thereby cause movement of one of said members movable individually in response to an overload and separation of said contact means.

References Cited in the file of this patent

UNITED STATES PATENTS

| | | |
|---|---|---|
| 826,888 | Sachs | July 24, 1906 |
| 974,109 | Auel et al. | Nov. 1, 1910 |
| 1,159,547 | Tate | Nov. 9, 1915 |
| 1,232,412 | Van Valkenburg | July 3, 1917 |
| 1,556,823 | Holmes | Oct. 13, 1925 |
| 1,556,825 | Wyman | Oct. 13, 1925 |
| 1,674,339 | Nass | June 19, 1928 |
| 2,330,690 | Dannenberg | Sept. 28, 1943 |
| 2,416,951 | Prince | Mar. 4, 1947 |
| 2,429,237 | Powell | Oct. 21, 1947 |
| 2,473,196 | Dannenberg | June 14, 1949 |
| 2,476,071 | Spiro | July 12, 1949 |
| 2,794,096 | Kozacka | May 28, 1957 |
| 2,824,929 | Edmunds | Feb. 25, 1958 |
| 2,843,702 | Edmunds | July 15, 1958 |
| 2,863,969 | Edmunds | Dec. 9, 1958 |
| 2,883,491 | Edmunds | Apr. 21, 1959 |
| 2,888,535 | Edmunds | May 26, 1959 |
| 2,905,791 | Edmunds | Sept. 22, 1959 |
| 2,911,502 | Edsall | Nov. 3, 1959 |
| 2,924,688 | Edmunds | Feb. 9, 1960 |
| 2,928,997 | Edmunds | Mar. 15, 1960 |

FOREIGN PATENTS

| | | |
|---|---|---|
| 13,522 | Australia | July 18, 1933 |